United States Patent [19]
Fukasawa

[11] 4,374,802
[45] Feb. 22, 1983

[54] OXYGENATOR

[75] Inventor: Hiromichi Fukasawa, Narashino, Japan

[73] Assignee: Terumo Corporation, Tokyo, Japan

[21] Appl. No.: 302,550

[22] Filed: Sep. 16, 1981

[30] Foreign Application Priority Data

Sep. 25, 1980 [JP] Japan ................................ 55-133172

[51] Int. Cl.³ .............................................. A61M 1/03
[52] U.S. Cl. ................................ 422/48; 128/DIG. 3; 210/321.3; 210/321.4
[58] Field of Search ............. 422/48; 210/321.3, 321.4; 128/DIG. 3

[56] References Cited

U.S. PATENT DOCUMENTS

| 3,490,523 | 4/1968 | Esmond | 165/166 |
| 3,506,406 | 4/1970 | Birch, Jr. | 23/258.5 |
| 3,927,981 | 12/1975 | Viannay et al. | 23/258.5 |
| 3,934,982 | 1/1976 | Arp | 422/48 |
| 4,075,100 | 2/1978 | Furuta et al. | 210/266 |
| 4,219,426 | 8/1980 | Spekle et al. | 210/321.3 X |
| 4,239,729 | 12/1980 | Hasegawa et al. | |

FOREIGN PATENT DOCUMENTS 2839937 4/1980 Fed. Rep. of Germany .
2344262 10/1977 France .
2354116 1/1978 France .

Primary Examiner—Barry S. Richman
Attorney, Agent, or Firm—Frishauf, Holtz, Goodman & Woodward

[57] ABSTRACT

A hollow fiber type oxygenator comprising a housing having an inlet port and an outlet port for oxygen and an inlet port and an outlet port for blood, and a plurality of hollow fibers for gas exchange disposed inside the housing along the longitudinal direction thereof. In the housing is formed an inward projection midway in the longitudinal length thereof for engaging and fastening the bundle of hollow fibers to the housing, and there is formed a liquid passage at the inward projection for discharging the water. The oxygenator is so constructed that no water accumulates at the inward projection and the gas exchange efficiency is maintained at a high level even after a protracted use.

7 Claims, 8 Drawing Figures

OXYGENATOR

BACKGROUND OF THE INVENTION

1. Field of the Invention

This invention relates to an oxygenator such as an artificial lung utilizing porous hollow fibers.

More particularly it concerns an artificial lung suitable for cases where the extracorporeal circulation periods extend over a long period of time and where an extended auxiliary circulation is required for patients suffering from respiratory failure.

2. Description of the Prior Art

The prior oxygenators may be classified roughly into the bubble type and the membrane type. Recently the latter is recommended for use because it damages the blood to a lesser extent. The membrane type oxygenator supplies oxygen to one side of a sheet of silicone membrane of the oxygen diffusion type, and the blood to the other side thereof, thereby causing an oxygen and carbon dioxide exchange through said membrane. However, this type of artificial lung was defective in that the use of a flat membrane necessarily increased the size of the apparatus, that the silicone rubber membrane is easily damaged as it contacts the membrane support member, and that extreme care is needed in handling the apparatus because of its extreme instability.

In view of these defects, the inventor of the present invention proposed a hollow fiber type artificial lung (disclosed in U.S. Pat. No. 4,239,729). The artificial lung disclosed in U.S. Pat. No. 4,239,729 has a construction wherein a bundle of hollow fibers consisting of a microporous membrane having excellent gas permeability is disposed instead of a silicone rubber membrane inside a housing, and the bundle is fastened at its center portion by an inward projection provided within the said housing. This artificial lung supplies the blood inside the hollow fibers, and oxygen into the space defined by the housing and the outer surface of the hollow fibers, thereby facilitating gas exchange of oxygen and carbon dioxide through the microporous hollow fibers. According to this artificial lung, various merits are achieved such as a higher gas exchange efficiency, excellent sturdiness of the apparatus, and compactness of the apparatus by the use of the microporous membrane with an improved gas exchange property. Uniform dispersion of oxygen gas and channeling prevention is achieved by provision of the inward projection which acts to fasten the hollow fiber bundles.

As a result of an experiment using the above mentioned oxygenator for an extended period of time, the inventor found out that the gas exchange efficiency deteriorated gradually as the water accumulated at the point where the inward projection fastens the hollow fiber bundle inside the oxygenator. In other words, the microporous membrane allows the steam to pass therethrough while it has an excellent gas exchange property so that the steam becomes condensed and forms dew as it contacts the inner wall of the housing after passing through the hollow fibers. When in use, the oxygenator is usually placed with its axial direction in respect of the earth so as to facilitate debubbling at the time of priming and discharging the water that accumulated. The water content which forms dew beneath the inward projection flows down to the lower part of the apparatus and causes no problem. However, the dew formed in the upper section of the apparatus accumulates in a pool above the inward projection. Accordingly, after the oxygenator has been used for an extended period of time, the water pool prevents the excessive passage of oxygen and then lowers the gas exchange efficiency.

SUMMARY OF THE INVENTION

An object of the present invention, therefore, is to provide a hollow fiber type oxygenator which maintains an excellent gas exchange efficiency for an extended period of time by discharging the water content which has accumulated above the inward projection of the oxygenator.

According to the present invention, there is provided a hollow fiber type oxygenator characterized in that it comprises an elongated hollow housing, a bundle of hollow fibers made of a plurality of hollow fibers for gas exchange disposed inside the said housing along the longitudinal direction thereof, two partition walls supporting the two end portions of the hollow fibers in a liquid tight manner without blocking the openings of the said hollow fibers and defining a gaseous chamber along with the inner wall of the said housing and the outer surfaces of the said hollow fibers, inlet and outlet ports for passing gaseous material communicating with the said chamber and provided extendingly through the wall of the said housing, inlet and outlet ports for passing the blood, each communicating with the interior spaces of each of the hollow fibers on the outside of the said partition walls, an inward projection formed in the intermediate portion of the said housing in the longitudinal direction thereof for fastening the bundle of hollow fibers, at least one of liquid passages formed at the said inward projection for passing the liquid collected at a narrow portion of the said housing defined by the said inward projection to one of the interiors of the said housing from the other one of the interiors of the said housing, the liquid flowing down along the inner wall of the said one interior portion of the said housing.

The first embodiment of the present invention is an oxygenator where the elongated hollow housing is an elongated round-cylindrical housing.

The second embodiment of the present invention is an oxygenator where the inlet and outlet ports for passing gaseous material is provided in the side wall of the said housing.

The third embodiment of the present invention is an oxygenator where the liquid passage is formed like a groove.

The fourth embodiment of the present invention is an oxygenator where the liquid passage is formed like a spiral groove.

The fifth embodiment of the present invention is an oxygenator where the cross sectional area of the groove is 0.005 to 2.9 mm$^2$.

The sixth embodiment of the present invention is an oxygenator where the value which is obtained by dividing the total cross sectional area of the grooves by the total membrane area of the bundle of the hollow fibers is not less than $2.7 \times 10^{-7}$.

The seventh embodiment of the present invention is an oxygenator where the width of the groove is smaller than the outer diameter of the hollow fiber and the depth thereof is less than two times the outer diameter of the said hollow fiber.

The eighth embodiment of the present invention is an oxygenator where the liquid passage is made like a rib.

DETAILED DESCRIPTION OF THE INVENTION

Figure 1:
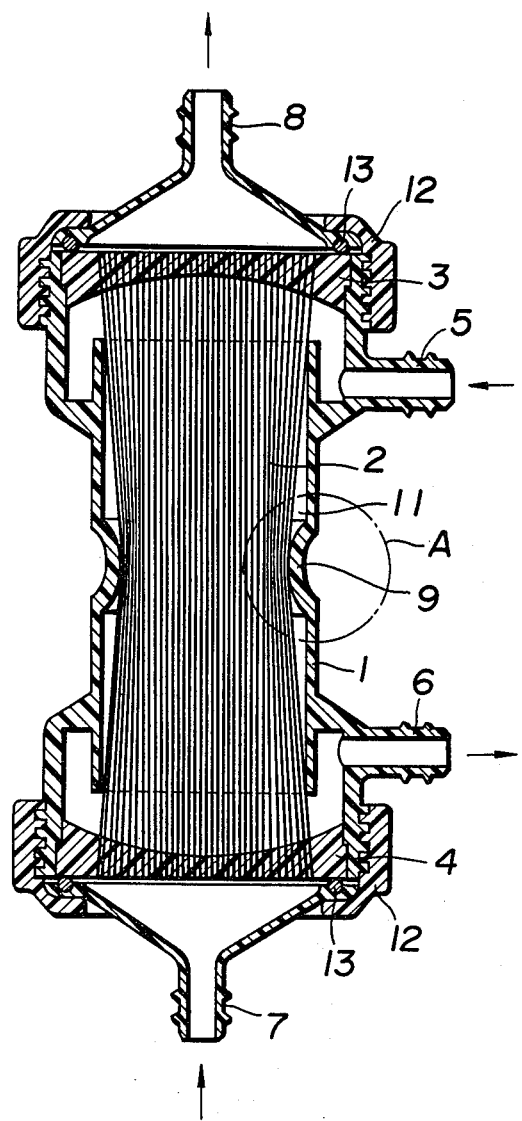
FIG. 1 is a cross sectional view of a hollow fiber type oxygenator embodying the present invention.
Figure 2:
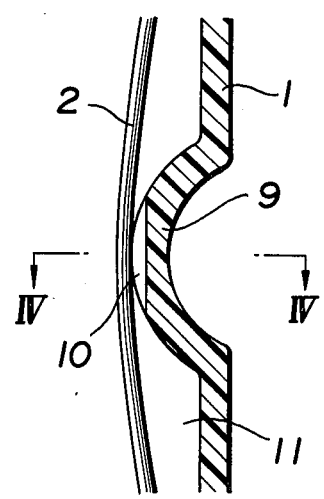
FIG. 2 is an enlarged cross sectional view showing the portion denoted as A in FIG. 1.
Figure 3:
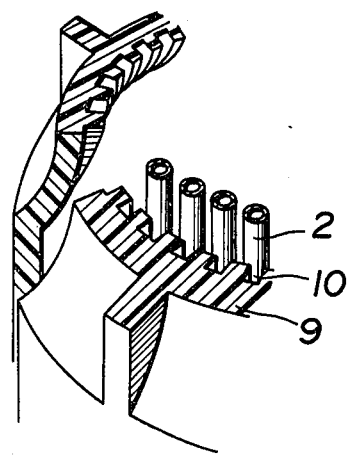
FIG. 3 is an exploded perspective view showing portion A of FIG. 1 in a magnified view.
Figure 4:
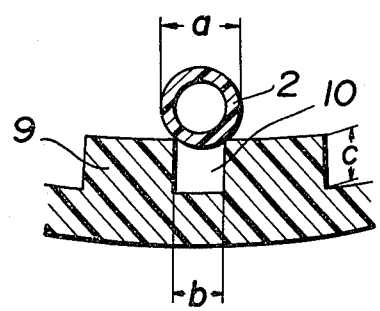
FIG. 4 is a cross sectional view of the main portion along the line IV—IV of FIG. 2.

The present invention is now explained in further detail referring to the accompanying drawings. FIG. 1 is a sectional view of a hollow fiber type oxygenator, and FIG. 2 is an enlarged view of the main portion of the oxygenator shown in FIG. 1. As shown, the oxygenator comprises a housing 1, a bundle of hollow fibers 2, two partition walls 3 and 4, an inlet port 5 and an outlet port 6 for the gaseous material, a blood inlet port 7, a blood outlet port 8, an inward projection member 9 and a plurality of passages for the liquid 10.

The housing 1 is not restricted in its shape so long as it is an elongated hollow housing, although it is preferably an elongated round-cylindrical housing. By specifically adopting the elongated round-cylindrical housing instead of just an elongated hollow housing, it is possible to improve the processing property and to uniformly distribute and arrange the hollow fibers within the housing. The bundle of hollow fibers 2 comprises a plurality of hollow fibers for gas exchange disposed inside the housing 1 along the longitudinal direction thereof. The bundle of hollow fibers 2 consists of such polyolefin resin as polypropyrene, polyethylne, etc. and has numerous pores which communicate the outside and the inside of the hollow fibers. It is preferable that the hollow fibers which comprise the bundle 2 have an inner diameter of about 100 to 1,000$\mu$, or more preferably 100 to 300$\mu$, a wall thickness of about 10 to 50$\mu$, an average pore size of about 200 to 2,000 Å, and a porosity of about 20 to 80%. The hollow fibers are different from the silicone rubber membrane which dissolves and disperses the gaseous material. It allows the transition of the gaseous material through pores as the volumetric flow, and lessens the membrane resistance in the transition of the gaseous matter. Therefore, its gas exchange performance is remarkably high. It is possible to use such coating materials as polyalkylsulfone, ethyl cellulose, polydimethyl siloxane, etc. which is highly effective in preventing thrombus formation with a thickness of 1 to 20$\mu$ on the inner surfaces of the hollow fibers which come into contact with the blood.

The above mentioned partition walls 3 and 4 support the hollow fibers at both ends thereof in a liquid tight manner and in such a way that they would not close the openings thereof, and define a chamber 11 for gaseous materials between the inner wall of said housing and the external wall of the hollow fibers. These partition walls 3 and 4 are comprised of a high molecular potting agent such as polyurethane, silicone resin, and epoxy resin.

The blood inlet port 7 and outlet port 8 are respectively shaped like a funnel, and communicate with the interior space inside the said hollow fibers outside the partition walls 3 and 4. The inlet port 7 and the outlet port 8 for the blood are respectively attached to the end of the housing 1 in an air tight manner by a ring-like screw-tightening tool 12 and O shaped ring 13. The inlet port 5 and the outlet port 6 for the gaseous material are provided respectively at the top and the bottom portions of the side wall of the housing 1, and communicate with the chamber 11 for the gaseous material. Provision of the inlet port 5 and the outlet port 6 on the side wall of the said housing will facilitate the manufacture.

The inward projection 9 is so formed as to fasten the bundle of hollow fibers 2 in the intermediate portion of the housing 1 in its longitudinal direction. The degree of fastening the bundle should be as high as 60 to 80% while the loading density of the remaining portion (the percentage of the space occupied by the bundle of the hollow fibers relative to the cross section of the housing) is 30 to 60%. In order to decrease the loading density of the hollow fiber bundle 2 at the inward projection 9, it is not recommended to merely dispose the hollow fiber bundle inside the housing 1. This will cause fluctuations in the interval size between the bundle of hollow fibers, and the oxygen gas passes selectively through the point where the interval is wider, thereby causing the oxygen gas to pass selectively and to cause channelling. Therefore it is recommended that the loading density be increased and intervals made uniform, thus preventing channelling and improving the exchange efficiency by a uniform gas exchange.

The above passage 10 for the liquid is formed like a groove at the inward projection 9 in the embodiment shown in FIGS. 1 through 4. The groove acts to permit the condensed liquid which has collected at a narrow portion of the housing 1 to flow into the interior of the said housing located below through the inward projection 9. This groove is so formed that its cross sectional area is 0.005 to 2.9 mm$^2$. This corresponds to the loading density of the hollow fiber bundle 2 at the inward projection 9. If it is less than 0.005 mm$^2$, the water does not flow smoothly while if it is over 2.9 mm$^2$, channelling tends to occur. It is desirable that the value which is obtained by dividing the total cross sectional area of the grooves by the total membrane area of the bundle of the hollow fibers be not less than $2.7 \times 10^{-7}$. Under the above conditions, the discharge rate of the liquid which is discharged through the groove is not less than the rate at which the liquid is collected at a narrow portion of the housing by letting the liquid condense and flow down on the inner wall of one of the interior portions of the housing. The groove has such dimensions that its width b is smaller than the outer diameter a of the hollow fibers, and its depth c is less than 2 times the external diameter of the hollow fiber. If a $\leq$ b, the hollow fibers would occasionally close the groove and the passage 10 is not formed, while if c $\geq$ 2a, then oxygen gas channelling is apt to occur because of a large cross section of the passage 10. If the passage is a groove along the axial direction, it is preferred that the number of passages be increased to the maximum permitted value so that the water content may flow down sufficiently smoothly. If the number of passages is limited, the water discharge efficiency becomes lowered, and the dead space covered by the water of the hollow fibers becomes increased, thereby deteriorating the gas exchange efficiency.

Figure 5:
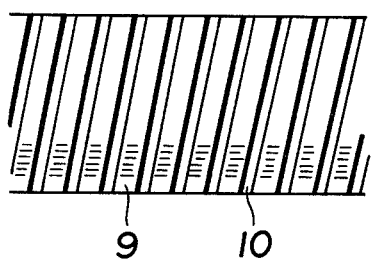
FIGS. 5 to 7 show the partial front view of embodiments of the liquid passage respectively.
Figure 6:
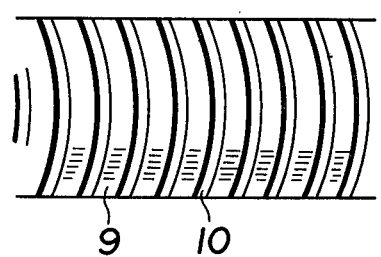
Figure 7:
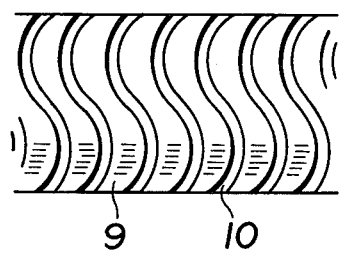
Figure 8:
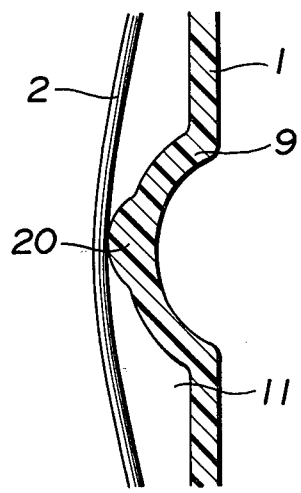
FIG. 8 is a cross sectional view showing another embodiment of the part shown in FIG. 2.

The passage for the liquid is not restricted to the grooves along the axial direction, but it may be shaped like a spiral groove as shown in FIGS. 5 to 7. In this case, the groove width is not restricted in anyway by the outer diameter of the hollow fibers since there is no possibility for the hollow fibers to block the grooves. The cross section of the grooves may be arbitrarily selected and made U-shape, V-shape, etc. in addition to ⊔ shape. The passage for the liquid may be comprised of ribs 20 instead of grooves as shown in FIG. 8. The space formed between the ribs may be of any arbitrary shape so long as it satisfies the conditions set for the above mentioned groove. It may also be comprised by attaching a band like member provided with pores prepared separately from the housing to the intermediate portion, especially to the center of the inner wall of the housing. According to this embodiment, the band-like member comprises an inward projection and the passage. The band-like member may be made of mesh material. In sum, the passage suffices so long as it has a function to discharge water and it may be of a cross sectional dimension and shape to prevent oxygen gas channelling. Any shapes of the passage which satisfy these conditions may be employed instead of the ones mentioned above.

The hollow fiber type oxygenator of the above construction is for instance used in open heart surgery, and is disposed in the perfusion circulation (usually at the flow rate of 1-4 l/min) as the blood is taken out of the vein of a patient and then returned to his artery. The blood passes through the bundle 2 of the hollow fibers from the inlet 7 and flows out through the outlet 8. On the other hand, oxygen gas or gas of which the main constituent is oxygen gas passes through the inlet 5 for gaseous material to the chamber 11 and flows out through the outlet 6. Inside the housing 1, carbon dioxide gas in the blood transfers to the side of the gas chamber 11 via the pores in the hollow fibers thereby facilitating the transition of oxygen gas to the blood inside the hollow fibers and the gas exchange therein.

According to the present invention, the hollow fiber bundle 2 is drawn and restricted in the intermediate portion, especially at its center in the longitudinal direction by the inner projection 9 so as to make the loading density at that portion uniform, thereby causing oxygen gas to circulate uniformly without causing channelling, and enhancing the exchange efficiency of oxygen and carbon dioxide gas. When the steam passes through the pores in hollow fibers and becomes condensed into dew as it contacts the inner wall surface of the housing 1, the water which has accumulated in the space beneath the inward projection 9 keeps flowing down inside the housing 1. On the other hand, the water which has condensed into dew in the space above the inward projection does not accumulate as in the prior art, but is discharged to the bottom passing through the liquid passage 10. Accordingly, little water accumulates at the inward projection 9 even after a protracted use of the oxygenator according to this invention, and therefore it is possible to maintain the high efficiency of the gas exchange property. As the oxygen gas passes through the liquid passage 10, it is also possible to further enhance the gas exchange property. The water which flows down is easily discharged to the outside through the gas outlet port 6 by tilting the housing 1.

EXPERIMENTAL EXAMPLE 1

The following example was performed using the oxygenator according to the present invention. The conditions and the result of the experiments are discussed below. The hollow fiber type oxygenator used in the experiment has a shape as shown in FIG. 1 and has the following dimensions; housing inner diameter at the inward projection 54 mm; total membrane area of the bundle of the hollow fibers 3.3 m$^2$; the loading density at the inner projection 65%; the loading density elsewhere 45%; the outer diameter and the inner diameter of the hollow fiber made of polypropyrene respectively 250μ and 200μ; the average pore size 500 Å; and the porosity about 50%. Each of the grooves provided at the inward projection has a width b=150μ and a depth c=150μ, totalling 360 pieces formed at uniform intervals in the circumferential direction of the housing. The blood which is passed through this oxygenator is a fresh bovine blood, to which heparine is added and which is maintained at 37° C. and with a Ht value of 35%, and the oxygen saturation at the entrance to the oxygenator is about 60% and the carbon dioxide partial pressure is about 50 mmHg.

This blood is passed at the flow rate of 3 l/min and oxygen at the rate of 3 l/min. The oxygen transfer rate and carbon dioxide transfer rate immediately after the start of circulation and at 4 hours thereafter were respectively measured. The results are shown in Table 1.

An oxygenator without grooves (but with the inward projection) was manufactured and the blood and oxygen gas were passed under similar conditions as in the above mentioned experiment. The results are also shown in Table 1.

TABLE I

|  |  | Oxygen transfer rate (ml/min) | CO$_2$ transfer rate (ml/min) |
| --- | --- | --- | --- |
| Oxygenator according to the present invention | Immediately after start of circulation | 168.8 | 172.5 |
|  | 4 hrs. after start of circulation | 167.5 (-0.8%) | 171.9 (-0.3%) |
| Oxygenator without grooves | Immediately after start of circulation | 165.4 | 175.2 |
|  | 4 hours after start of circulation | 160.1 (-3.2%) | 162.3 (-7.4%) |

From the above Table 1, it will be seen that the oxygenator according to the present invention stands up to a protracted use showing no deterioration in their performances concerning removal of carbon dioxide and addition of oxygen gas. Observation of the oxygenator revealed that no water accumulated at the inward projection of the oxygenator according to the present invention at 4 hours after the start of use while that of the comparative example showed a great quantity of water accumulation.

As has been described heretofore, the present invention is extremely effective for extracorporeal circulation for an extended period of time and for extended auxiliary circulation for patients with respiratory failures.

EXPERIMENTAL EXAMPLE 2

The following examples was performed using the oxygenator according to the present invention. The conditions and the result of the experiments are discussed below.

The hollow fiber type oxygenator used in the experiment has a shape as shown in FIG. 1 and has dimensions shown in Table 2. The conditions other than shown in Table 2 are the same as the experimental example 1.

After the start of blood circulation, very little water was accumulated at the inward projection of some oxygenators. The minimum number of grooves provided at the inward projection of the oxygenator in which no water was accumulated at the inward projection were measured. The results are shown in Table 2.

TABLE 2

| outer diameter of a hollow fiber ($\mu$) | width of a groove b ($\mu$) | depth of a groove c ($\mu$) | cross sectional area of a groove s (mm$^2$) | number of grooves n | total cross sectional area of the grooves S = sn (mm$^2$) | total membrane area M (m$^2$) | housing inner diameter at the inward projection (mm) | S/M |
|---|---|---|---|---|---|---|---|---|
| 250 | 240 | 490 | 0.12 | 13 | 1.56 | 5.4 | 76 | $2.9 \times 10^{-7}$ |
|  |  |  |  | 8 | 0.96 | 3.3 | 60 | $2.9 \times 10^{-7}$ |
|  |  |  |  | 4 | 0.48 | 1.6 | 43 | $3.0 \times 10^{-7}$ |
|  | 200 | 400 | 0.08 | 20 | 1.60 | 5.4 | 76 | $3.0 \times 10^{-7}$ |
|  |  |  |  | 11 | 0.88 | 3.3 | 60 | $2.7 \times 10^{-7}$ |
|  |  |  |  | 6 | 0.48 | 1.6 | 43 | $3.0 \times 10^{-7}$ |

From the above Table 2, it will be seen that the necessary total cross sectional area of the grooves is in proportion to the total membrane area of the bundle of the hollow fibers. By setting the value which is obtained by dividing the total cross sectional area of the grooves by the total membrane area of the bundle of the hollow fibers to be not less than $2.7 \times 10^{-7}$, the discharge rate of the liquid which is discharged through the groove is not less than the rate at which the liquid is collected at a narrow portion of the housing by letting the liquid condense and flow down on the inner wall of one of the interior portion of the housing. So, it is desirable in the present invention to set the value on the above condition.

Any number of the grooves which satisfy the above conditions may be employed.

The rate of the steam through a membrane is not related to the outer diameter of a hollow fiber, but to a membrane area.

What we claim is:

1. An oxygenator for blood, comprising:
   an elongated hollow housing;
   a bundle of hollow fibers made of a plurality of hollow fibers for gas exchange disposed inside said housing along the longitudinal direction thereof, the ends of said hollow fibers having openings;
   two partition walls respectively supporting the two end portions of the hollow fibers in a liquid tight manner without blocking the openings at the ends of said hollow fibers and defining a gaseous chamber along with the inner wall of the said housing and the outer surfaces of the said hollow fibers;
   inlet and outlet ports for passing gaseous material, said inlet and outlet ports being in communication with the interior of said chamber and extending through a wall of said housing;
   inlet and outlet ports for passing blood, each communicating with the interior spaces of each of said hollow fibers on the outside of the said partition walls;
   an inward projection formed in an intermediate portion of said housing in the longitudinal direction thereof for engaging and fastening said bundle of hollow fibers to said housing and defining chamber portions inside said housing on opposing sides of said inward projection;
   at least one liquid passing groove formed at said inward projection for passing liquid collected at a narrow portion of the said housing defined by said inward projection from one of said chamber portions to the other end of said chamber portions in said housing, said collected liquid flowing down along the inner wall of said one chamber portion of said housing, through said at least one groove, and to said other chamber portion;
   each groove having a cross sectional area of from about 0.005 to 2.9 mm$^2$;
   said grooves having a total cross sectional area S and said hollow fibers of said bundle of hollow fibers having a total membrane area M such that S/M is not less than $2.7 \times 10^{-7}$.

2. The oxygenator as claimed in claim 1 wherein said elongated hollow housing is an elongated round-cylindrical housing.

3. The oxygenator as claimed in claim 1 or 2 wherein said inlet and outlet ports for passing gaseous material are provided in a side wall of said housing.

4. The oxygenator as claimed in claim 1 wherein said at least one liquid passing groove is in the form of a spiral groove.

5. The oxygenator as claimed in claim 1 wherein the width of said at least one liquid passing groove is smaller than the outer diameter of each of said hollow fibers, and the depth thereof is less than 2 times the outer diameter of each of said hollow fibers.

6. The oxygenator as claimed in claim 1 comprising a plurality of ribs on said inward projection defining a plurality of said liquid passing grooves which are formed at said inward projection.

7. The oxygenator as claimed in any one of claims 1, 4, 5 or 6, wherein said at least one liquid passing groove has a generally ⊔-shaped cross section.

* * * * *